United States Patent [19]

Levy

[11] 4,213,432
[45] Jul. 22, 1980

[54] DEVICE FOR VAPORIZING LIQUID HYDROCARBON FUEL

[76] Inventor: Dudley D. Levy, 590 Laconia Ave., Lake Worth, Fla. 33463

[21] Appl. No.: 26,226

[22] Filed: Apr. 2, 1979

[51] Int. Cl.² ............................................. F02M 31/00
[52] U.S. Cl. .................................... 123/549; 123/557; 123/590; 261/142
[58] Field of Search .................. 123/122 E, 122 F; 261/142, DIG. 39, 78 R; 219/206, 207

[56] References Cited

U.S. PATENT DOCUMENTS

| | | | |
|---|---|---|---|
| 1,150,619 | 8/1915 | Percival | 123/122 F |
| 1,171,145 | 2/1916 | Sachs | 123/122 F |
| 3,915,137 | 10/1975 | Evans | 123/122 F |

*Primary Examiner*—Ronald H. Lazarus
*Attorney, Agent, or Firm*—Wenderoth, Lind & Ponack

[57] ABSTRACT

A device for vaporizing the liquid hydrocarbon fuel as it enters a stream of flowing oxygen-containing gas. The device has a fuel feed tube, a Venturi for conducting a stream of oxygen-containing gas past the end of the feed tube, a vaporizable liquid hydrocarbon fuel supply connected to the feed tube, a corrugated heater plate at the end of the feed tube, where it projects into the stream of gas and an electric resistance heater in the plate. A thermostat is electrically and thermally coupled with the resistance heater for controlling the temperature of the heater. Alternatively the corrugated heater plate can be in front of a fuel injection nozzle for a Diesel engine or an oil burner.

4 Claims, 3 Drawing Figures

DEVICE FOR VAPORIZING LIQUID HYDROCARBON FUEL

This application relates to vaporization of liquid hydrocarbon type fuel, and more particularly relates to means for vaporizing such fuel prior as it is entrained into a stream of oxygen-containing gas for eventual combustion.

BACKGROUND OF THE INVENTION AND PRIOR ART

It is well-known that for burning a liquid hydrocarbon type fuel, the combustion is much more efficient and complete when the fuel is vaporized prior to being mixed with the oxygen-containing gas for combustion. The vaporization of the fuel makes possible more complete contact of the molecules of the fuel with the oxygen-containing gas than if the liquid is simply atomized into droplets of liquid, thereby ensuring complete combustion of the fuel under appropriate combustion conditions.

The prior art devices for mixing a liquid hydrocarbon type fuel with an oxygen-containing gas, such as air, conventionally atomize the fuel into droplets of liquid instead of vaporizing it. This is done in a variety of ways, the purpose being to subdivide the liquid fuel into small particles, thereby providing a maximum of surface contact between the particles of liquid and the oxygen-containing gas. Vaporization under these conditions will take place only after combustion begins, and the heat of combustion vaporizes some of the particles.

As a result of the use of the atomizing technique, if conditions for combustion are not perfectly controlled, there often results incomplete combustion of the hydrocarbon, thus increasing the carbon monoxide and hydrocarbon gas levels in the products of combustion.

In atomization devices for conventional internal combustion type engines, the fuel is normally sucked into the throat of a carburetor through a feed tube, with the air being sucked into the carburetor flowing past the end of the feed tube and atomizing the liquid flowing from the feed tube. A similar type of action takes place in a so-called injection type system, in which the liquid fuel is positively injected into the flowing stream of air. In addition to the usual problems with atomization, such system very often result in some of the fuel particles being heavier than others, and the heavier fuel particles have a tendency to separate within the airstream and cause a change in the air/fuel mixture. This adds to the production of unburned hydrocarbons in products of combustion. Not only does it add to the polluting effect of the exhaust gases and waste of fuel, but it causes engine knocking and dieseling after the ignition is turned off. This is because the heat of the engine causes the heavy fuel particles, particularly those in low octane gasoline which is now in more common use, to ignite. It is also a cause of the oily smell of Diesel engines.

Similar problems exist with oil burners, which generally atomize the liquid hydrocarbon fuel by the use of pressure on either the fuel itself being forced out of the nozzle, on the air supplied to the nozzle with the fuel, or both. Again, the effect of this action is to atomize the fuel into very small particles of various sizes, with the same atomization and combustion problems as occur in the internal combustion engines.

A few proposals have been made to heat the fuel supplied to the engines or oil burners, but at most, this heating has been to adjust the vaporization temperature and is usually to assist starting in cold weather.

OBJECTS AND BRIEF SUMMARY OF THE INVENTION

It is an object of the present invention to provide means for instantaneously and completely vaporizing a liquid hydrocarbon fuel just as it enters a stream of flowing oxygen-containing gas.

It is a further object of the invention to provide such a vaporizing means which can be easily incorporated in existing devices for mixing liquid hydrocarbon fuel and oxygen-containing gas, such as carburetors, fuel injectors and oil burners.

These objects are achieved by the provision of a device according to the present invention in which a corrugated heater plate having an electric resistance heater therein is positioned at the exit of a fuel feed tube to cause the fuel to flow in a turbulent flow, the heater being controlled for heating the fuel to a temperature which is from a temperature about half way between the vaporization temperature of the liquid fuel and the temperature at which the vaporized fuel becomes explosive in the oxygen-containing gas and for supplying the latent heat of varporization to the fuel.

BRIEF DESCRIPTION OF THE DRAWINGS

The invention will now be described in greater detail in connection with the accompanying drawings, in which.

DETAILED DESCRIPTION OF THE INVENTION

The liquid fuel vaporizing means according to the present invention will first be described in connection with a downdraft carburetor for a conventional internal combustion engine.

Figure 1:
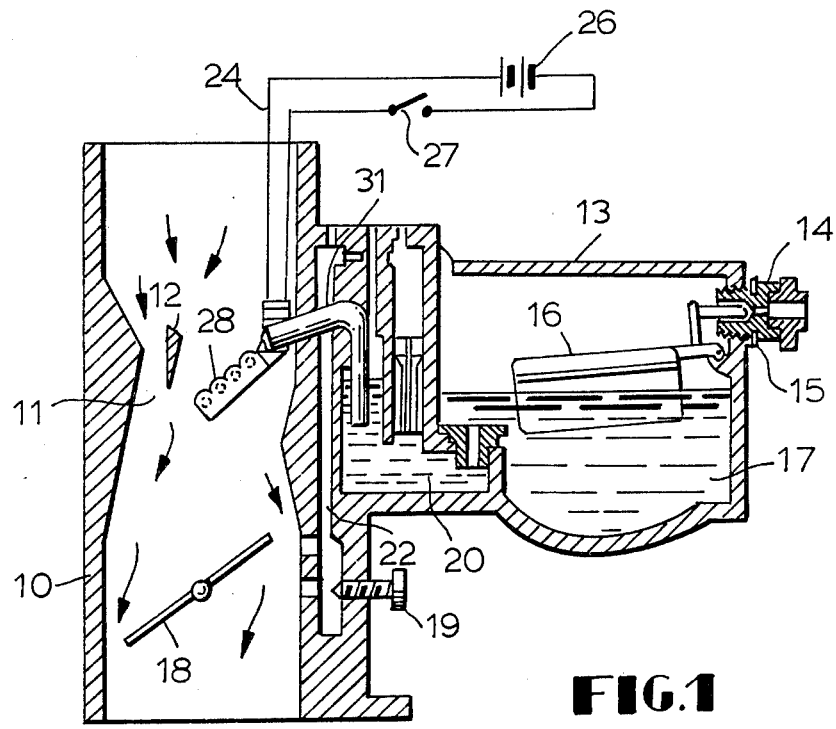
FIG. 1 is a schematic sectional view of a conventional downdraft carburetor for an internal combustion engine showing the fuel vaporizing means of the present invention.
Figure 2:
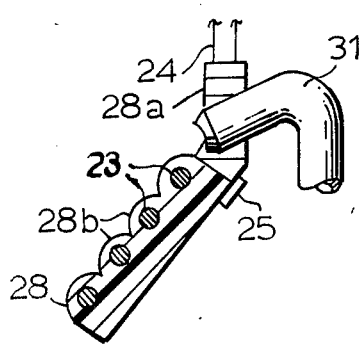
FIG. 2 is an enlarged sectional view of the tip of the fuel feed tube of the carburetor of FIG. 1.

Referring to FIGS. 1 and 2, there is shown a conventional downdraft carburetor having an intake tube 10 with a Venturi throat 11 therein, in which is positioned an air flow guide 12 for guiding the air being drawn downward to the engine into the throat 11. A fuel reservoir 13 is mounted on the side of the intake tube 10, and has a fuel intake 14 thereon which is connected to the fuel tank for supplying fuel to the engine, and a float valve 15 is provided in the fuel intake 14 which is opened and closed by a float 16 floating in the body of fuel 18 within the reservoir 13. A throttle valve 18 in the form of a pivot plate is positioned in the intake tube downstream of the throat 11, and a needle valve 19 is provided in the air bleed passage 22 opening into the intake tube 10.

A supply chamber 20 opens from the fuel reservoir 13, and a feed tube 21 has one end positioned in the supply chamber and extends upwardly and then laterally into the throat 11 of the intake tube 10.

The carburetor as thus far described is conventional, and during operation, with the throttle valve open to a greater or lesser degree, air is sucked downwardly through the intake tube 10, and liquid fuel is drawn through the feed tube 21 into the stream of flowing air, and the liquid is atomized as the air flows past the end of the tube in the throat 11.

The means for vaporizing the fuel according to the present invention comprise a corrugated plate 28 depending from the end of the feed tube 21 at an angle into the stream of air. The plate 28 can be attached to the end of the feed tube 21 by a bracket 28a, and has embedded therein an electrical resistance heater in the form of a resistance wire 23 extending back and forth along the horizontal corrugations 28b of the plate. Current is supplied to the coil 23 through wires 24 from a current supply 26, which in a motor vehicle can be the battery of the vehicle. The size of the heater and the current supply must be such that sufficient heat is generated to supply the latent heat of vaporization of the fuel being carburized and to heat it to a temperature in the range between a temperature about halfway between the vaporization temperature and the temperature at which the vaporized fuel becomes explosive in the oxygen-containing gas and the temperature at which the vaporized fuel becomes explosive in the oxygen-containing gas. Preferably a switch 27 is provided in the circuit for controlling the start and end of the supply of current. The switch can be incorporated in the multi-position igntition switch of an automobile, for example, so that it can be turned on prior to the starting of the engine, and so that it will remain on during running of the engine. In the circuit to one of the wires 24 is a thermostatic element 25 which senses the heat from the heater 23 and automatically interrupts the current supply when the temperature increases above the desired temperature.

In operation, the heater 23 is turned on by closing the switch 27 prior to the time it is desired to start the internal combusiton engine, and after allowing for preheating of the end of the plate 28, the engine is started in the usual fashion, thus drawing air through the throat 11 and sucking fuel through the tube 21. The heat of the heater 23 and the heated plate 28 will instantaneously and completely vaporize the fuel as it is drawn out of the end of the tube 21 and cascades down the plate 28 into the airstream, thereby providing a readily combustible mixture of fuel and air to the internal combustion engine.

The plate 28 operates to create a turbulent flow of the liquid fuel. Some of the fuel will vaporize from the tops of the corrugations into the air stream. The remaining fuel will flow down into the grooves between the corrugation where it is further heated to varporize it.

Thus, the vaporization is greatly improved because the latent heat of vaporization is supplied to the fuel and it is heated prior to reaching the engine cylinders. Thus, what is burned in the cylinders is substantially all vaporized fuel, not a mixture of only some vapor and the remainder droplets of various sizes which cause unburned particles in the exhaust.

The temperature of the heater 23 where the oxygen-containing gas is air and the fuel is gasoline is between about 400° F. and a temperature at which the gasoline becomes explosive in air.

It has been found that with a system according to the present invention on a conventional internal combustion engine, the air/fuel mixture can be increased to a ratio of 17/1 to 19/1, at which point the NOx and the gaseous hydrocarbons and carbon monoxide in the exhaust from the engine begin to decrease very rapidly. Accordingly, the system according to the present invention increases the efficiency with which the fuel is used, and also reduces the unburned materials in the exhaust, thereby reducing the pollution produced by the engine.

In addition, because of the vaporizeed fuel in the air, the compression ratio of the engine can be increased, which increases fuel economy and provides greater power in an internal combustion engine.

Moreover, because of the complete vaporization of the fuel, knock and dieseling are eliminated, since the heavy unburned particles of fuel in the exhaust are eliminated, and there are no particles to be ignited by the heat of the engine after the ignition is turned off. This is particularly advantageous at the present time when the octane rating of gasoline is being reduced.

Because a greater amount of air may be necessary to provide the higher air/fuel ratio, it may be desirable to provide for supply of air under pressure to the carburetor, such as from a supercharger or a fan. This can be connected to the air intake of the carubration system in a manner known in the art.

The present invention also makes possible the use of fuels other than pure gasoline, for example mixture of alcohol and gasoline, so-called gasahol, as well as mixtures of gasoline with kerosine and diesel oil. The complete vaporization of the fuel achieved by the present invention eliminates the problems normally encountered in conventional internal combustion engines by such alternate fuels.

Finally, because the unburned fuel particles are eliminated from the exhaust, this reduces the need for pollution control devices designed to burn the exhaust gas to burn up fuel which is not burned in the engine itself.

Figure 3:
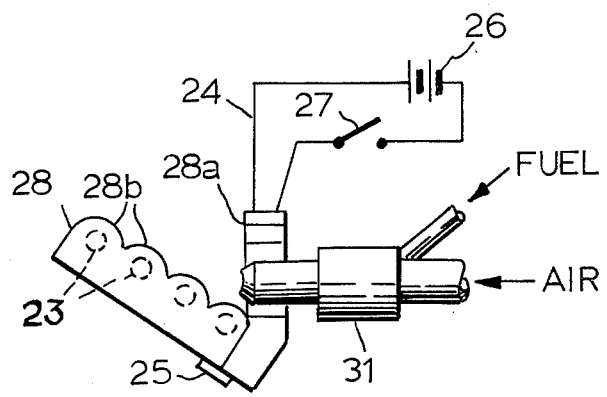
FIG. 3 is an enlarged sectional view of a heated corrugated plate positioned for receiving fuel from a fuel injection nozzle in a fuel injection system for an internal combustione engine.

It will of course be understood that the same arrangement can be provided on the feed tube for a fuel injection type carburetor for an internal combustion engine such as a Diesel engine, and can be provided on the fuel feed tube for the atomizer for an oil burner, with essentially the same effect. As seen in FIG. 3 the corrugated plate 28 is placed so as to be struck by the stream of fuel coming from nozzle 31, i.e. at an angle across the outlet of the nozzle. Other than this position, the plate 28 is the same as that shown in FIGS. 1 and 2.

It will be understood that the invention thus overcomes many of the problems associated with Diesel engines, such as the presence of unburned fuel particles in the exhaust and the oily smell. Since these are eliminated by the complete vaporization, the invention will improve the operation and fuel efficiency of the Diesel engines and make them more acceptable to consumers.

What is claimed is:

1. A device for vaporizing liquid hydrocarbon fuel as it enters a downwardly flowing stream of flowing oxygen-containing gas, comprising a reservoir for a vaporization liquid hydrocarbon fuel, a fuel feed tube extending upwardly out of said reservoir and then laterally, means for conducting a stream of oxygen-containing gas downwardly past the end of said feed tube for drawing fuel through said fuel feed tube, a corrugated heater plate mounted on the end of said feed tube and projecting from the end of the feed tube into the stream of gas and an electric resistance heater in said plate and having a heating capacity for heating the amount of fuel flowing through said fuel feed tube to supply the latent heat of vaporization thereto and heat the fuel to a temperature between a temperature about halfway between the temperature of vaporization and the temperature at which the vaporized fuel becomes explosive in the oxygen-containing gas, whereby the fuel is instantaneously and completely vaporized upon coming in contact with said corrugated plate.

2. A device as claimed in claim 1 in which said corrugated plate is mounted on the end of said tube extending at an acute angle to and downward in the direction of the flow of the stream of gas past the end of said tube for causing fuel to flow in a turbulent flow over the corrugations.

3. A device as claimed in claim 1 in which said corrugated plate extends upwardly across the opening from said tube to have fuel projected from said tube strike said plate.

4. A device as claimed in claim 1 further comprising a thermostat means electrically and thermally coupled with said resistance heater for controlling the temperature of said heater.

* * * * *